United States Patent [19]
Edakubo et al.

[11] Patent Number: 5,335,129
[45] Date of Patent: Aug. 2, 1994

[54] INTERCHANGEABLE COMPACT TAPE CASSETTE

[75] Inventors: Hiroo Edakubo, Kanagawa; Tatsuzo Ushiro, Saitama; Osamu Nagatsuka, Kanagawa; Junji Kobayashi, Tokyo, all of Japan

[73] Assignee: Canon Kabushiki Kaisha, Tokyo, Japan

[21] Appl. No.: 791,470

[22] Filed: Nov. 13, 1991

[30] Foreign Application Priority Data

Nov. 13, 1990 [JP] Japan ............................ 2-304070
Nov. 13, 1990 [JP] Japan ............................ 2-304071

[51] Int. Cl.⁵ ............................................ G11B 23/087
[52] U.S. Cl. .................................... 360/132; 360/94
[58] Field of Search ................................ 360/132, 94

[56] References Cited

U.S. PATENT DOCUMENTS 4,683,510  7/1987  Meguro .......................... 360/132
4,733,317  3/1988  Sato ............................... 360/132
4,926,279  5/1990  Kurashina ...................... 360/132
4,947,276  8/1990  Meguro .......................... 360/132
4,969,611  11/1990 Katagiri et al. .............. 360/132 X
5,075,812  12/1991 Lee ................................ 360/132

FOREIGN PATENT DOCUMENTS 60-243886 12/1985 Japan ............................. 360/132

Primary Examiner—John H. Wolff
Attorney, Agent, or Firm—Robin, Blecker, Daley & Driscoll

[57] ABSTRACT

A tape cassette is arranged to have its size reduced by arranging its tape reels to have a small flange diameter and by arranging a partition wall located opposite to a cassette aperture part across the tape reels to be close to the tape reels. A casing of the tape cassette is composed of two bodies including a first body which is disposed on the side of the aperture part, and a second body which is disposed on the side of the partition wall and is arranged to be movable.

4 Claims, 4 Drawing Sheets

INTERCHANGEABLE COMPACT TAPE CASSETTE

BACKGROUND OF THE INVENTION

1. Field of the Invention

This invention relates to a tape cassette which contains a tape-shaped recording medium to be used by a recording and reproducing apparatus for recording or reproducing image or sound information by means of a rotary head drum which is provided with a head or heads.

2. Description of the Related Art

Reduction in sizes of camera-integrated type video tape recorders or the like has made rapid progress of late. However, the size of the tape cassette and the diameter of the rotary head drum are laying limits to the possible reduction in size of the mechanism of a video tape recorder (hereinafter referred to as the VTR).

Therefore, in the case of the VTR of the kind adopting the VHS system, a compact tape cassette which is arranged for short-time recording and is called "VHS-C" is developed so as to reduce the size of the mechanism with the reduced size of the tape cassette. The compact tape cassette VHS-C is arranged to require the use of a cassette adapter. The arrangement, however, presents the following problems:

(1) In loading the compact tape cassette on a VTR arranged for a standard cassette, it is necessary to use the cassette adapter which is expensive. The user of the VTR is required to purchase the cassette adapter and is forced to do the troublesome work of inserting and taking the compact tape cassette into and out of the cassette adapter.

(2) In attaching the compact tape cassette to the cassette adapter, the structural arrangement of a front lid of the compact tape cassette is greatly restricted and is not provided with a locking mechanism for the front lid. This is because the compact tape cassette is not allowed to protrude from the cassette adapter with the front lid thereof left in an open state.

As to a reduction in size of a VTR of the 8 mm type, Japanese Laid-Open Patent Application No. SHO 60-171684 has disclosed an arrangement which is as follows: FIG. 2 of the accompanying drawings is an oblique view showing the reverse side appearance of a short-time recording cassette 30 to be used by the VTR. The short-time recording cassette 30 is arranged to have a wider aperture part 39 on its bottom side 30' than the aperture part 5 of a standard cassette 1 which is shown in FIG. 1, while the outside dimensions of the cassette 30 are the same as the standard cassette 1. To make the aperture part 39 wider, the flange diameters of reels 31 and 32 are reduced by shortening the recordable time of the tape-shaped recording medium. The aperture part 39 is thus widened to allow the mechanism of the VTR to be placed within the outside dimensions of the cassette.

The above-stated arrangement eliminates the shortcomings of the method of using the cassette adapter. However, this arrangement has the following shortcomings:

(1) In order to attain the advantageous effect of the arrangement, the mechanism, particularly the rotary head drum, must be arranged to enter the tape cassette at a position below the upper end of the cassette. This requirement then causes the thickness of the mechanism to increase as a whole. Further, the arrangement limits the latitude of a tape path and also tends to result in a complex mechanism.

(2) The short-time recording cassette has about the same outside shape as the standard cassette. Therefore, the user tends to mistake the former for the latter. To prevent the mistake, the VTR must be arranged to have different loading positions for both the standard cassette and the short-time recording cassette.

As described by way of example in the foregoing, the prior art arrangements for reducing the size of the tape cassette have been hardly satisfactory.

SUMMARY OF THE INVENTION

It is an object of this invention to provide a tape cassette which is arranged to eliminate the short-comings of the prior art and to contribute to a reduction in size of the mechanism of the VTR and to ensure interchangeability between a short-time recording cassette and a standard cassette without recourse to a troublesome cassette adapter.

To attain this object, a tape cassette according to this invention is arranged to reduce the diameters of the flanges of tape reels, and to reduce the size of the tape cassette by causing a partition wall of a casing of the tape cassette which is on one side of the tape cassette opposite to a cassette aperture part across the tape reels to be located closer to the tape reels. The above-stated cassette casing is composed of two casing elements, including a first casing element which is disposed on the side of the aperture part and a second casing element which is disposed on the side of the partition wall, and the second casing element is arranged to be movable.

In the embodiment, the reel flange diameter is reduced by the shortness of recording time. The smaller diameter of the reel flange then permits the rear part of the tape cassette to be curtailed for reduction in the outside size of the tape cassette. In addition to that, the short-time recording cassette is arranged according to this invention to be expandable from the reduced size to the size of the standard cassette to ensure interchangeability with standard cassettes.

The above and other objects and features of this invention will become apparent from the following detailed description of an embodiment thereof taken in connection with the accompanying drawings.

DETAILED DESCRIPTION OF THE PREFERRED EMBODIMENT

Figure 3:
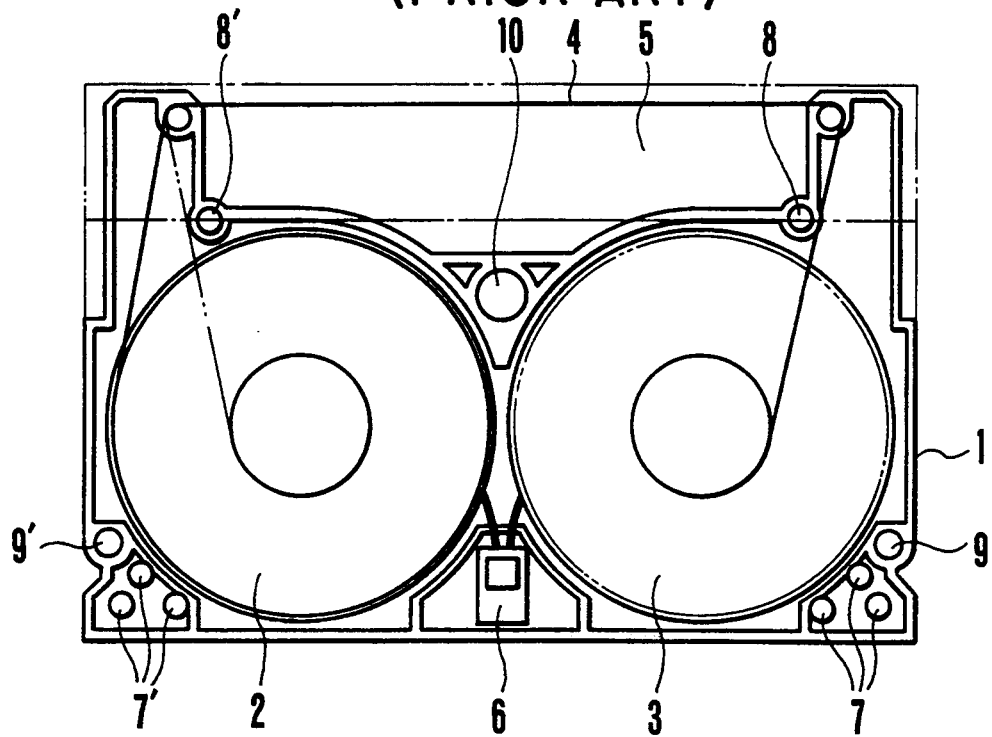
FIG. 3 is a plan view showing a standard cassette to be compared with an embodiment of this invention.

The following describes an embodiment of this invention with reference to the accompanying drawings:

FIG. 3 shows in a plan view a standard cassette 1 which is arranged to permit long-time recording and is illustrated for the purpose of comparison with the embodiment of this invention. Referring to FIG. 3, a tape 4 is wound around a pair of reels 2 and 3 and is extended between the reels 2 and 3 before the standard cassette 1 is loaded on the loading mechanism of a VTR. The tape 4 is covered with a front lid and a back lid which are not shown but are arranged to be turnable. On the rear side of the cassette 1, there is provided an aperture part 5 for permitting the tape 4 to be pulled out by inserting a post or the like into the cassette 1 on the inner side of the tape 4. Claw parts which are not shown are formed along the peripheral parts of the flanges of the reels 2 and 3. A reel lock 6 is arranged to prevent the tape 4 from slackening by engaging the claw parts. Information windows 7 and 7' are arranged to transmit information on the thickness, kind, length, etc., of the tape 4. The information is expressed by opening and closing these windows. Positioning holes 8, 8', 9 and 9' are provided in the cassette 1 for positioning the cassette 1 on the mechanism. A sensor hole 10 is provided for inserting a light emitting element thereinto. The light emitting element is arranged to transmit information on the fore and rear ends of the tape 4 by detecting transparent tape parts which are located respectively at the fore and rear ends of the tape 4.

The above is the outline of the standard cassette to be used for comparison with a tape cassette which is arranged according to this invention as an embodiment thereof. This invention has been contrived to provide a short-time recording cassette which permits a reduction in size of the mechanism without impairing the characteristics of the standard cassette.

Figure 4A:
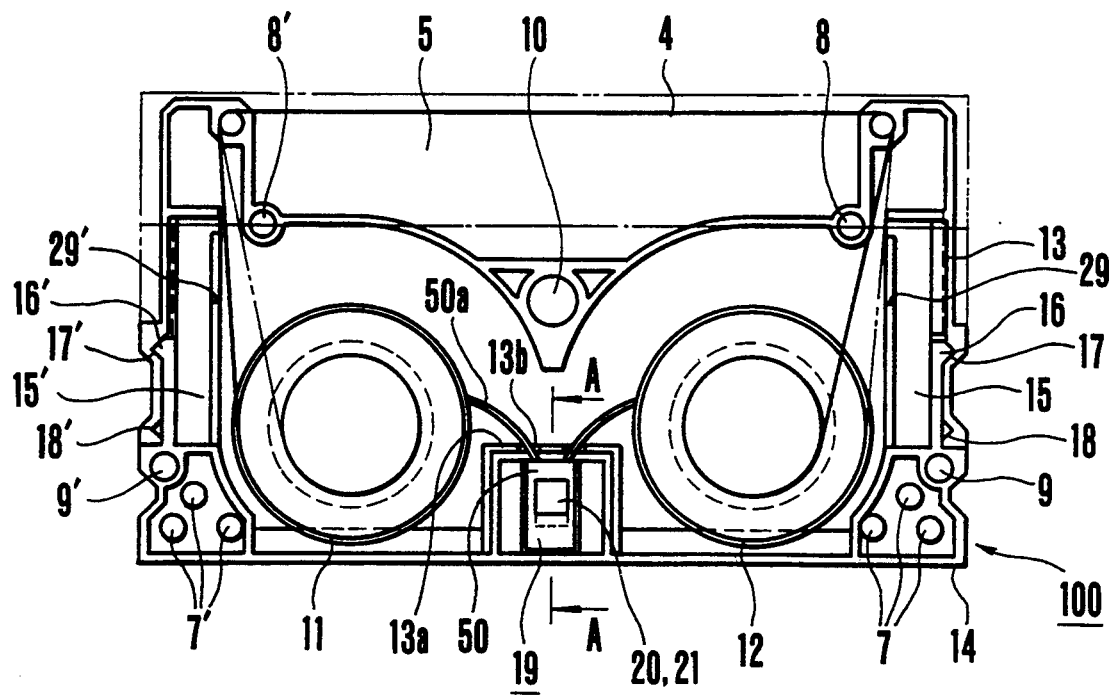
FIG. 4(a) is a plan view showing a tape cassette arranged as the embodiment of this invention with the rear part of a cassette half not in a protruding state.
Figure 4B:
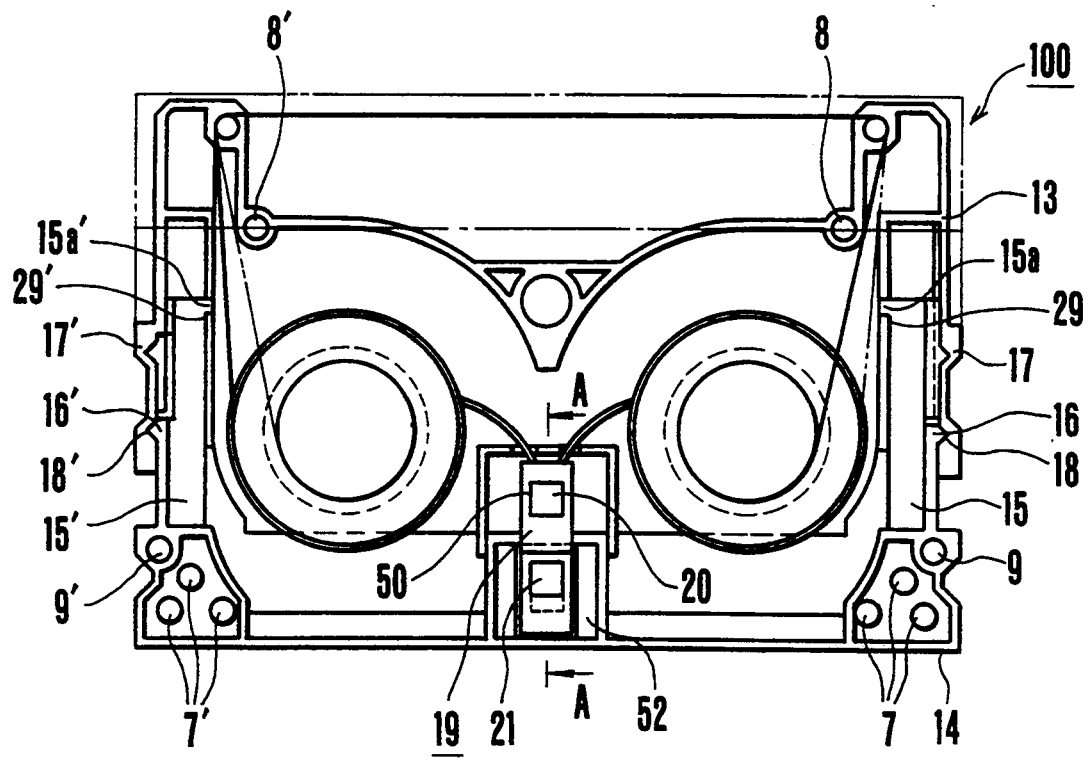
FIG. 4(b) is a plane view showing the same embodiment with the rear part of the cassette half in the protruding state up to the size of the standard cassette for interchangeability with the latter.

FIGS. 4(a) and 4(b) are plane views showing the essential parts of a tape cassette 100 which is arranged according to this invention as the embodiment thereof. FIG. 4(a) shows the cassette 100 as in a shape for a short-time recording operation. Since the tape cassette 100 is arranged to be used only for short-time recording, reels 11 and 12 have a small flange diameter. The flanges of these reels 11 and 12 are provided with claws which are not shown but are arranged along the peripheral parts of the flanges to engage a reel lock 19 in the same manner as the standard cassette 1. However, a simple arrangement to reduce the size of each flange of the standard cassette 1 would bring about a dead space on the rear side (lower side as viewed in FIG. 4(a)) of the cassette. To avoid such a dead space, the total width of the cassette must be shortened to reduce the size of the cassette. For this purpose, the cassette half is divided into a fore part 13 and a rear part 14. The fore and rear parts 13 and 14 of the cassette half divided into two are arranged to be movable along slide guide parts 15 and 15'.

The rear part 14 of the cassette half has information windows 7 and 7', and positioning holes 9 and 9'. A distance from positioning hole 8 or 8' to the positioning hole 9 or 9' which is obtained when the tape cassette 100 is in the shape of the short-time recording cassette differs from the distance obtained when the tape cassette 100 is in the shape of the standard cassette. The rear part 14 of the cassette half is provided with protruding parts 16 and 16' which are resilient. The fore part 13 of the cassette half is provided with a pair of recessed parts 17 and 17' and another pair of recessed parts 18 and 18'. The protruding parts 16 and 16' of the rear part 14 are arranged to resiliently engage either recessed parts 17 and 17' or 18 and 18' of the fore part 13 in positioning the rear part 14 of the cassette half. The protruding parts 16 and 16' are engaging the recessed parts 17 and 17' when the tape cassette 100 is to be used in the short-time recording shape. The reel lock 19 of the tape cassette 100 is also in a double structural arrangement including two aperture parts 20 and 21. The positions of these aperture parts 20 and 21 are arranged to coincide with each other when the cassette 100 is to be used in its short-time recording shape.

Figure 5A:
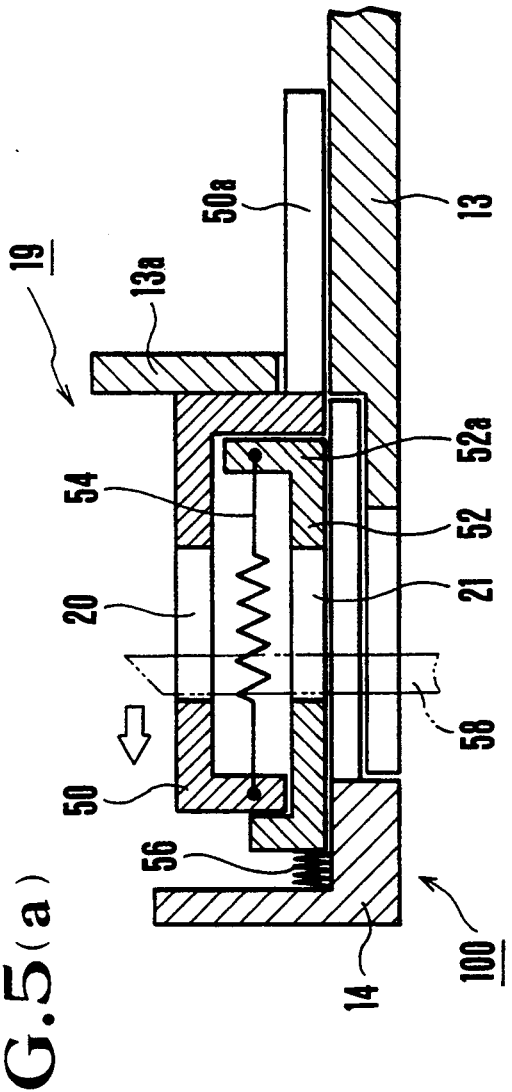
FIG. 5(a) is a sectional view showing the essential parts of a reel lock of the same embodiment as in a state of having the rear part of the cassette half not protruded.
Figure 5B:
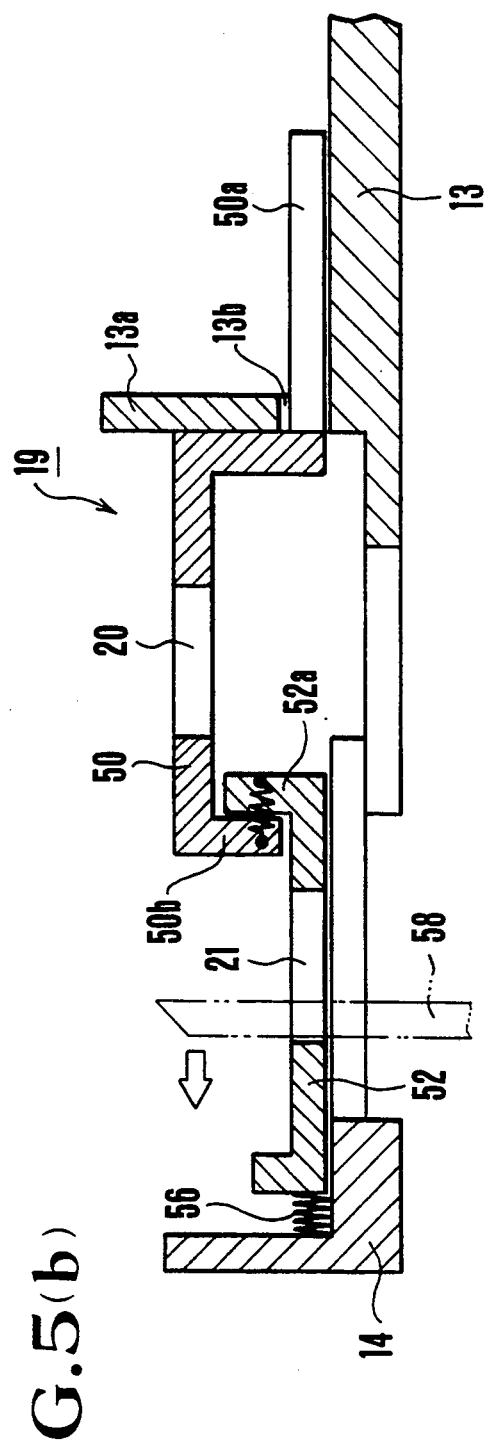
FIG. 5(b) is a sectional view showing the essential parts of the reel lock as in a state of having the rear part of the cassette half protruded.

Referring to FIGS. 5(a) and 5(b) which are sectional views taken on lines A—A of FIGS. 4(a) and 4(b), the structural arrangement of the reel lock 19 is described as follows: FIG. 5(a) represents a state where the rear part 14 of the cassette half is not protruding further from the fore part 13 of the cassette half as shown in FIG. 4(a). FIG. 5(b) represents a state where the rear part 14 is protruding further from the fore part 13 as shown in FIG. 4(b). The reel lock 19 consists of an upper member 50 and a lower member 52 which are inter-connected by a spring 54. This spring 54 urges these members 50 and 52 with a tensile force. Further, another spring 56 has one end thereof secured to the rear part 14 of the cassette half. That spring 56 urges the upper and lower members 50 and 52 to move together to the right as viewed in FIG. 5(a). However, the rightward movement of the upper member 50 is limited by a restricting part 13a which is erected on the fore part 13 of the cassette half.

The reel lock 19 operates as follows: while the rear part 14 of the cassette half is not protruding as shown in FIG. 5(a), the lower member 52 is urged and pushed to the right by the spring 56 as viewed in FIG. 5(a). Meanwhile, the upper member 50 which is connected to the lower member 52 by the spring 54 is urged by the urging force of the spring 54 also to move to the right as viewed in FIG. 5(a). However, the restricting part 13a which is provided for limiting the rightward movement causes the upper part 50 to stop in a position as shown in FIG. 5(a). When the VTR is loaded with the cassette 100, the reels 11 and 12 are unlocked in the following manner: with the cassette 100 mounted on the VTR, a release member 58 which is movably provided on the VTR is inserted into the aperture parts 20 and 21 of the tape cassette 100. After that, the upper member 50 is moved against the force of the spring 56 when the release member 58 is moved in the direction of an arrow. Therefore, a lock part 50a which is formed in one body with the upper member 50 also moves in the direction of the arrow to release the reels 11 and 12 from a locked state.

This unlocking action of the lock part 50a is described as follows with reference to FIG. 4(a): following the downward movement of the upper member 50, as viewed in FIG. 4(a), the lock part 50a is pulled downward from a hole 13b provided in the restricting part 13a. Then, the lock part 50a which spreads right and left is converged by the hole 13b toward its center. As a result, the fore ends of the lock part 50a move away from the reels 11 and 12 to unlock them.

Next, in a case where the rear part 14 of the cassette half is protruding as shown in FIG. 5(b), the reel lock 19 operates as follows: in this instance, the lower member 52 is displaced further leftward, as viewed in FIG. 5(b), than in the case of FIG. 5(a). However, the reel locking operation in this instance is basically the same as the operation described in the foregoing. The upper and lower members 50 and 52 are urged together by the spring 56 while the rightward movement of the upper member 50 is limited by the restricting part 13a. In unlocking the reels 11 and 12, the release member 58 is inserted into the aperture part 21 and is moved to the right as viewed in FIG. 5(b) to cause the lower member 52 to move against the force of the spring 56. In this instance, the end part 52a of the lower member 52 pushes the end part 50b of the upper member 50 to the left as viewed in FIG. 5(b). Therefore, the lock part 50a which is formed in one body with the upper member 50 also moves to the left to unlock the reels 11 and 12.

FIG. 4(b) is a plan view showing the cassette 100 as in a state of being expanded to the size of the standard cassette by allowing the rear part 14 of the cassette half to protrude from its position obtained in the short-time recording shape to give interchangeability with the standard cassette. Referring to FIG. 4(b), the protruding parts 16 and 16' of the rear part 14 of the cassette half are caused to ride on the slanting parts of the recessed parts 17 and 17' and come to engage the recessed parts 18 and 18' to be positioned there. Then, the protruding parts 15a and 15a' of the slide guides 15 and 15' abut on stoppers 29 and 29' which are provided on the fore part 13 of the cassette half for preventing the rear part 14 from slipping out of position. Further, the lower member 52 of the reel lock 19 slides in this instance to bring the aperture part 21 into an aperture position for the standard cassette. The upper and lower members 50 and 52 of the reel lock 19 which are interconnected by the spring 54, as mentioned in the foregoing, move together.

As apparent from the foregoing description, in spite of the fact that the embodiment is a short-time recording cassette, the cassette has all the functions and arrangement including a distance between reel shafts, tape position, etc., required for a standard cassette, so that the short-time recording cassette is perfectly interchangeable with the standard cassette. Besides, the embodiment contributes to a reduction in size of the VTR, because the tape loading mechanism which has a complex structural arrangement remains unchanged despite of the reduced size of the tape cassette.

Figure 1:
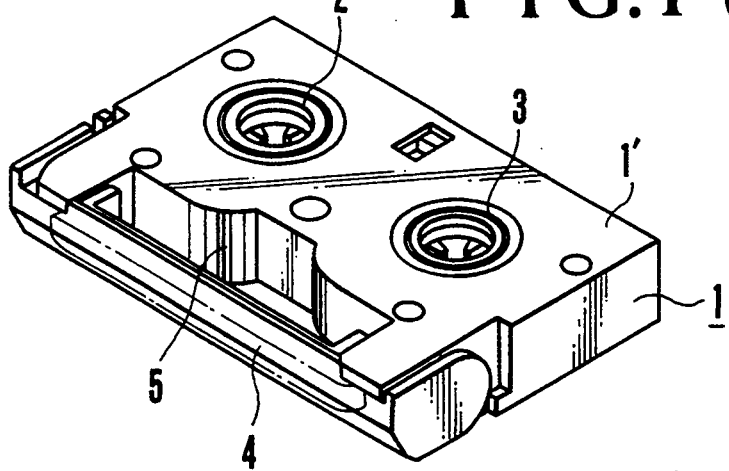
FIG. 1 is an oblique view showing a standard cassette as viewed from the reverse side thereof.
Figure 2:
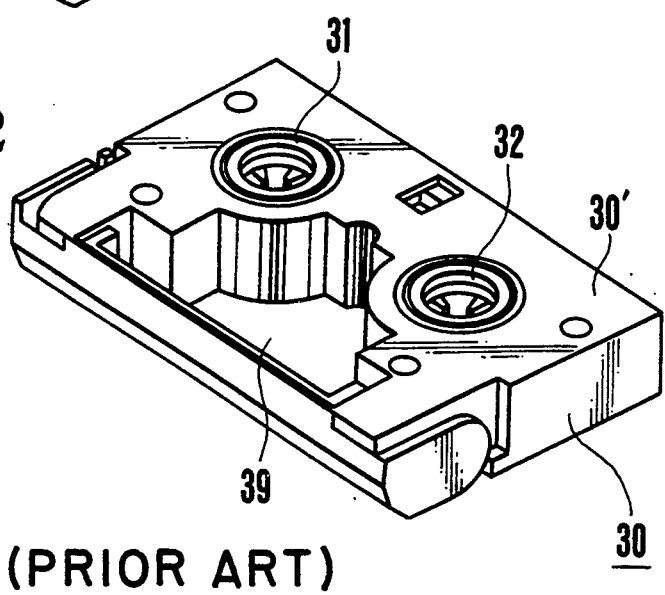
FIG. 2 is an oblique view showing by way of example a prior art modification of the standard cassette as viewed from the reverse side thereof.
Figure 6:
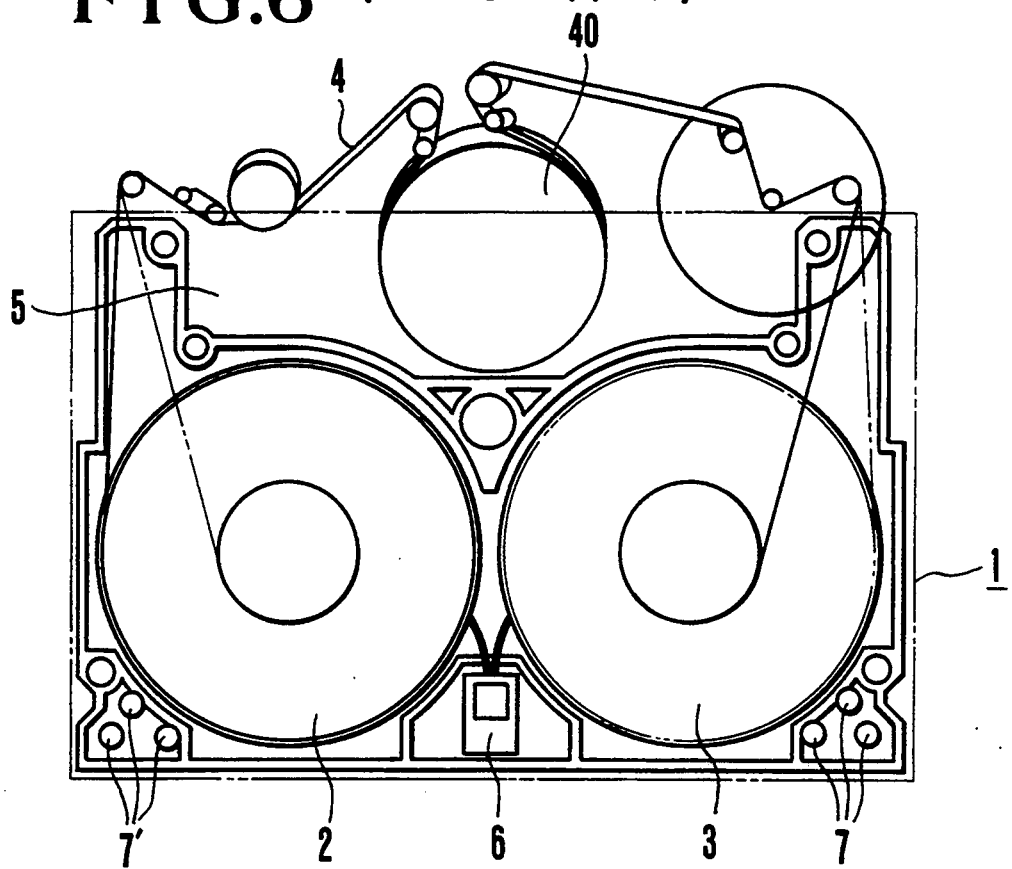
FIG. 6 shows the tape path of the standard cassette.

FIG. 6 shows the tape path of the conventional standard cassette 1. This standard cassette is shown in FIG. 1 in an oblique view as viewed from the reverse side thereof. The tape 4 which is wound around the reels 2 and 3 are guided by a plurality of guide posts. The tape 4 is then wrapped around a rotary head drum 40 to form a predetermined tape path there. As shown, the major portion of the mechanism arranged to wrap the tape 4 around the rotary head drum 40 is disposed on the side of the aperture part 5 of the cassette 1. Meanwhile, on the opposite side of the cassette 1 across the reels 2 and 3, there are arranged an information detecting switch which is not shown, a reel lock release member 58, etc.

Figure 7:
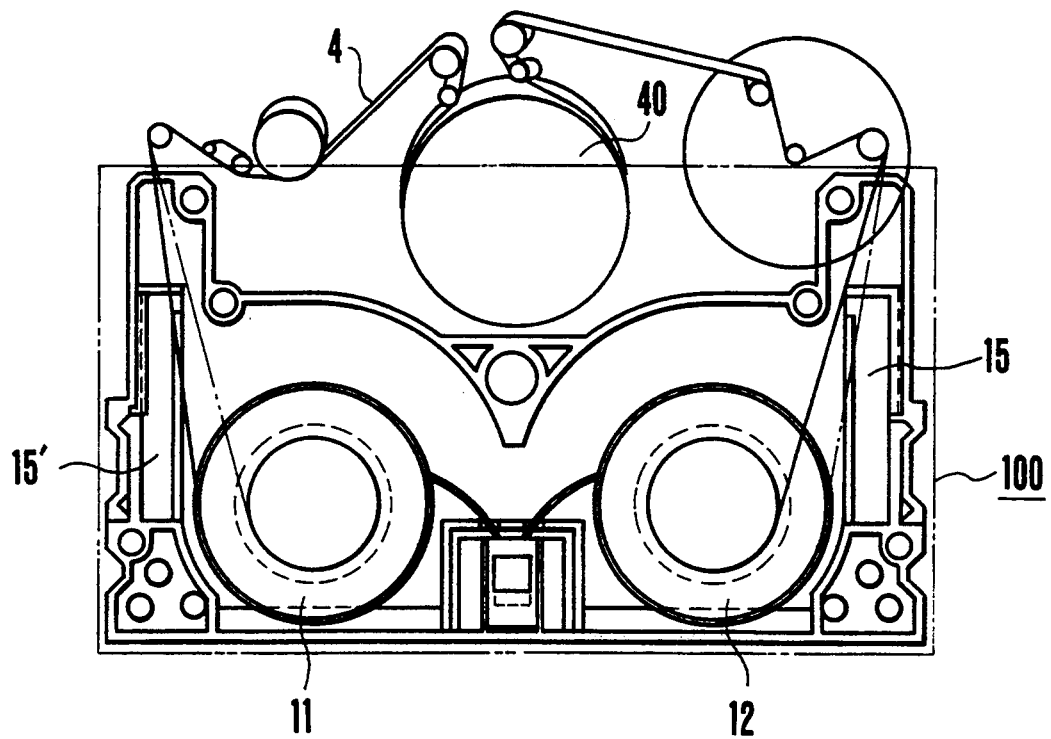
FIG. 7 shows the tape path of the tape cassette arranged according to the invention.

FIG. 7 shows the tape path of the tape cassette 100 arranged as the embodiment described in the foregoing. The cassette 100 is arranged to have a shorter rear part although its tape path is identical with the tape path shown in FIG. 6. It is, therefore, apparent that this arrangement permits reduction in size of the mechanism.

The arrangement of this embodiment described in the foregoing gives the following advantages:

(1) Interchangeability can be retained between the short-time recording cassette and the standard cassette without recourse to any cassette adapter.

(2) The amount of latitude allowed in designing the tape path is not impaired by the arrangement.

(3) The size of the cassette can be reduced without changing the complex tape loading mechanism.

What is claimed is:

1. A tape cassette containing a tape-shaped recording medium in a state of being wound around a pair of reels, comprising:
   a) a first casing having an aperture part through which the tape-shaped recording medium can be externally pulled out from the cassette; and
   b) a second casing arranged to engage said first casing and to be slidable in the direction of externally pulling out the tape-shaped recording medium, the tape-shaped recording medium being contained in both said first and second casings wherein said tape cassette is usable in either of the position where said second casing is pulled out relatively to said first casing and the position where said second casing is not pulled out relatively to said first casing.

2. A tape cassette according to claim 1, further comprising a lock member arranged to restrain the reels from rotating.

3. A tape cassette according to claim 2, wherein said lock member has an unlocking operation part arranged to be movable along with said second casing.

4. A tape cassette according to claim 1, wherein said second casing is arranged to be lockable at a plurality of positions in the sliding direction thereof relative to said first casing.

* * * * *